(12) United States Patent
Procter et al.

(10) Patent No.: US 10,170,781 B2
(45) Date of Patent: Jan. 1, 2019

(54) SHUTDOWN AND STORAGE METHOD FOR FUEL CELL SYSTEM AT BELOW FREEZING TEMPERATURES

(71) Applicants: Daimler AG, Stuttgart (DE); Ford Motor Company, Dearborn, MI (US); Nissan Motor Co., Ltd., Yokohama-shi, Kanagawa (JP)

(72) Inventors: Michael Procter, North Vancouver (CA); Yosuke Fukuyama, Kanagawa (JP); Richard Fellows, Vancouver (CA); Takeshi Shiomi, Kanagawa (JP)

(73) Assignees: Daimler AG, Stuttgart (DE); Ford Motor Company, Dearborn, MI (US); Nissan Motor Co., Ltd., Yokohama-shi, Kanagawa (JP)

( * ) Notice: Subject to any disclaimer, the term of this patent is extended or adjusted under 35 U.S.C. 154(b) by 170 days.

(21) Appl. No.: 15/258,141

(22) Filed: Sep. 7, 2016

(65) Prior Publication Data
US 2017/0084939 A1  Mar. 23, 2017

(51) Int. Cl.
*H01M 8/04* (2016.01)
*H01M 8/04223* (2016.01)
*H01M 8/04303* (2016.01)
*H01M 8/04701* (2016.01)
*H01M 8/04955* (2016.01)
(Continued)

(52) U.S. Cl.
CPC ..... *H01M 8/04253* (2013.01); *H01M 8/0432* (2013.01); *H01M 8/04037* (2013.01); *H01M 8/04231* (2013.01); *H01M 8/04303* (2016.02); *H01M 8/04619* (2013.01);
(Continued)

(58) Field of Classification Search
CPC ......... H01M 8/04253; H01M 8/04303; H01M 8/04037; H01M 8/04231; H01M 8/0432; H01M 8/04619; H01M 8/04701; H01M 8/04955; H01M 8/04228
See application file for complete search history.

(56) References Cited

U.S. PATENT DOCUMENTS

| | | | |
|---|---|---|---|
| 7,534,511 B2 * | 5/2009 | Lin ................ | H01M 8/04007 429/429 |
| 2003/0162063 A1 * | 8/2003 | Yoshizawa ........ | H01M 8/04007 429/413 |

(Continued)

FOREIGN PATENT DOCUMENTS

| | | | | |
|---|---|---|---|---|
| JP | 2004039528 A | * | 2/2004 | ........ H01M 8/04029 |
| JP | 2005100694 A | * | 4/2005 | |

*Primary Examiner* — Gregg Cantelmo
(74) *Attorney, Agent, or Firm* — Stephan A. Pendorf; Patent Central LLC (57) ABSTRACT

Improved methods are disclosed for shutting down and storing a fuel cell system, particularly for below freezing temperature conditions. The methods comprise stopping power production from the fuel cell stack, monitoring the amount of energy remaining in an energy supply, monitoring the stack temperature, and repeatedly performing a predetermined warming operation if the stack temperature falls to a normal threshold temperature and if the amount of energy remaining exceeds a certain minimum amount. In the improved methods, when the amount of remaining energy is less than or equal to the minimum amount, a final warming operation is performed that differs from the predetermined warming operation.

9 Claims, 6 Drawing Sheets

(51) Int. Cl.
*H01M 8/0432* (2016.01)
*H01M 8/04537* (2016.01)
*H01M 8/04007* (2016.01)
*H01M 8/04228* (2016.01)

(52) U.S. Cl.
CPC ... *H01M 8/04701* (2013.01); *H01M 8/04955* (2013.01); *H01M 8/04228* (2016.02)

(56) References Cited

U.S. PATENT DOCUMENTS

| | | | |
|---|---|---|---|
| 2007/0166577 A1* | 7/2007 | Inai | H01M 8/04007 429/413 |
| 2007/0292728 A1* | 12/2007 | Shibata | H01M 8/04104 429/429 |
| 2007/0298289 A1 | 12/2007 | Clingerman et al. | |
| 2010/0028728 A1* | 2/2010 | Clingerman | H01M 8/04126 429/411 |
| 2010/0098979 A1* | 4/2010 | Imamura | H01M 8/04029 429/431 |
| 2010/0239929 A1* | 9/2010 | Kajiwara | H01M 8/04223 429/431 |
| 2014/0093801 A1 | 4/2014 | Rogahn et al. | |

* cited by examiner

SHUTDOWN AND STORAGE METHOD FOR FUEL CELL SYSTEM AT BELOW FREEZING TEMPERATURES

BACKGROUND

Field of the Invention

This invention relates to methods for shutting down and storing a fuel cell system at below freezing temperatures. In particular, it relates to methods for shutting down and storing an automotive fuel cell system comprising a solid polymer electrolyte fuel cell stack.

Description of the Related Art

Fuel cells such as solid polymer electrolyte fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within a fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

In certain applications, fuel cell stacks may be subjected to repeated on-off duty cycles involving storage for varied lengths of time and at varied temperatures. It is generally desirable to be able to reliably start-up such stacks in a short period of time. Certain applications, like automotive, can require relatively rapid, reliable start-up from storage conditions well below freezing. This has posed a significant challenge both because of the relatively low rate capability of cells at such temperatures and also because of problems associated with water management in the cells when operating below 0° C. A certain amount of water is required for proper fuel cell operation (e.g. for hydration of the membrane electrolyte) and water is also generated as a result of providing electrical power. However, ice of course forms where liquid water is present at such temperatures. The presence of ice can be problematic depending on how much there is and its location when storing or when starting up a fuel cell stack. The formation of ice in the electrochemically active MEAs of the fuel cells is particularly problematic during startup from below freezing temperatures.

As a result of the importance of this issue and the difficulties involved, numerous fuel cell designs and start-up methods have been proposed in the art to address the various problems encountered during start-up from temperatures below freezing. In addition though, various methods have been proposed for appropriately shutting down and storing fuel cells in anticipation of below freezing storage conditions. For instance, a method has been proposed in US20070298289 which involves determining the potential that a freeze condition will exist after the system is shut-down based on predetermined input, such as ambient temperature, geographical location, user usage profile, date, weather reports, etc. If the system determines that a freeze condition is probable, then the system initiates a purge shut-down of the fuel cell system where water is purged out of the reactant gas flow channels. If the system determines that a freeze condition is unlikely, then it will initiate a normal shut-down procedure without purging the flow channels. The system will then periodically determine if the conditions have changed, and can initiate a "keep warm" strategy if it is determined that a potential freeze condition exists. If the fuel level is insufficiently high to keep it warm however, the system will instead initiate the purge.

In another example, US20140093801 discloses a system and method for selectively determining whether a freeze purge should be performed at shut-down of a fuel cell stack. The method includes identifying that the vehicle has been keyed off and then determining whether a stack membrane humidification value (lambda) is less than a predetermined humidification value that identifies the humidification of membranes in fuel cells in the fuel cell stack. If the stack membrane humidification value is not less than the predetermined humidification value, then the method determines if the ambient temperature is below a predetermined ambient temperature, and if so, performs the freeze purge. If the ambient temperature is not below the predetermined ambient temperature, then the method performs a short non-freeze purge of the flow channels in the fuel cell stack. The method determines a wake-up time for a controller for a next time to determine whether a freeze purge should be performed.

Despite the advances made to date, there remains a need for improved methods for appropriate shutdown and storage of fuel cell systems in subzero temperature conditions. This invention represents an option for fulfilling these needs and provides further related advantages.

SUMMARY

The present invention relates to shutting down and storing a fuel cell system in which the system comprises a fuel cell stack that is producing power and a supply of energy which can be used for heating the fuel cell stack (e.g. the existing fuel supply for the fuel cell stack or optionally a storage battery for energizing an appropriate electric heater). Further, the invention comprises a method for starting up the fuel cell system from temperatures below freezing.

Specifically, the method for shutting down and storing the fuel cell system comprises stopping power production from the fuel cell stack, monitoring the amount of energy remaining in the energy supply, monitoring the temperature of the fuel cell stack, and performing certain warming operations if the stack temperature falls too low. In particular, predetermined warming operations are repeatedly performed if the stack temperature falls to a normal threshold temperature and if the amount of energy remaining exceeds a minimum amount (typically just more than that amount of energy required to perform one more final warming operation). In the present invention, a final warming operation is performed if the stack temperature falls to the normal threshold temperature and if the amount of fuel remaining is less than or equal to the minimum amount. The final warming operation in the present invention differs from the predetermined warming operation. The method is suitable for starting up the fuel cell system from temperatures below freezing (e.g. in which the normal threshold temperature is less than 0° C.).

In one version of the method, the predetermined warming operation heats the stack to a predetermined target temperature, the final warming operation heats the stack to a final target temperature, and the predetermined target temperature is less than the final target temperature.

In another version of the method, the predetermined warming operation heats the stack for a predetermined time period, the final warming operation heats the stack for a final time period, and the predetermined time period is less than the final time period.

In yet other versions of the method, optionally the relative humidity of a reactant gas (either the fuel or the oxidant reactants gases, or both) supplied to the fuel cell stack can be lower during the final warming operation than during the predetermined warming operation. Alternatively, the flow rate of a reactant gas supplied to the fuel cell stack can be greater during the final warming operation than during the predetermined warming operation. Alternatively, the pressure of a reactant gas supplied to the fuel cell stack can be lower during the final warming operation than during the predetermined warming operation.

In yet another alternative option, the predetermined warming operation can comprise the steps of heating the stack for a predetermined time period, and performing a predetermined purge after the predetermined time period, while the final warming operation can comprise the steps of heating the stack for a final time period, and performing a final purge after the final time period. In this option, the final purge runs longer than the predetermined purge.

In these various versions of the method, the steps of performing the predetermined and final warming operations can be selected from the group consisting of producing power from the fuel cell stack and heating the fuel cell stack with an electric heater.

The invention also includes fuel cell systems comprising a fuel cell stack (particularly a solid polymer electrolyte fuel cell stack), a supply of energy for heating the fuel cell stack, apparatus for monitoring the amount of energy remaining in the fuel cell system, apparatus for monitoring the temperature of the fuel cell stack, and apparatus for performing predetermined and final warming operations, and in which the fuel cell system is configured to operate according to the preceding methods. Further, the invention is particularly suitable for use in automotive fuel cell systems.

These and other aspects of the invention are evident upon reference to the attached Figures and following detailed description.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

Further, the term "hydration state" is used herein to refer to the relative amount of water present in a membrane electrode assembly (MEA) in a fuel cell. Here, hydration states are denoted as $\{H_i\}$, where i is a positive integer. Then, for instance, with respect to a given MEA having $i^{th}$ and $j^{th}$ hydration states, the expression $\{H_i\}<\{H_j\}$ indicates that the amount of water present in the $i^{th}$ hydration state is less than the amount of water present in the $j^{th}$ hydration state.

Methods and associated systems have been developed for improved shutdown and storage of fuel cell systems, and particularly for subzero temperature conditions. In such circumstances, a "keep warm" strategy may desirably be employed to keep the fuel cell stack in the system above at least a minimum temperature, if possible. Such a "keep warm" strategy may involve repeatedly subjecting the stack to a series of warming operations each time the temperature of the stack falls below a certain threshold temperature during storage. In this way, the difficulties in starting up the fuel cell stack from very low temperatures (i.e. temperatures below the certain threshold temperature) can be avoided. A suitable warming operation may simply consist of running the fuel cell stack under controlled conditions for a brief period. Alternatively, the stack may be heated with an electric heater powered by a storage battery in the system. However, after a sufficient number of repeated warming operations, eventually the fuel supply (or the storage battery) in the fuel cell system may become exhausted and thus the system may be incapable of performing another warming operation. The last warming operation performed before the system is incapable of performing another warming operation is referred to as the final warming operation.

In prior art "keep warm" strategies, the same threshold temperatures and warming operations are generally used throughout the entire shutdown and storage period (i.e. the same threshold temperature trigger points and the same operations and/or operating parameters are used for the initial, subsequent, and final warming operations employed). In the present improved methods however, a different approach is adopted for the initial and/or the final warming operations.

In an automotive fuel cell system, the fuel cell stack may be operating in a much wetter condition (i.e. a greater hydration state) prior to shutdown than is desirable for long term storage at freezing temperatures. This is because significant liquid water may be present in the reactant flow-fields and channels in most cases prior to shutdown. Unless special and time-consuming preparation steps are taken prior to and/or during shutdown (e.g. shutdown purges or stack purges), this water will remain in the cells and freeze during storage at below subzero temperatures. After such a shutdown, the presence of ice in various locations throughout the stack can adversely affect subsequent startups, including the warming operations employed in a "keep warm" strategy.

A relatively low hydration state is preferred during low temperature storage of automotive fuel cell stacks and thus a stack is desirably maintained in such a state when employing a "keep warm" strategy during storage. However, a warming operation approach that is suitable for repeated warming operations of a stack in a relatively low hydration state may not be suitable for an initial warming operation of a stack in a relatively high hydration state and in which there is significant ice. Problems may be experienced if this is attempted during an initial warming operation on a stack which had been shutdown in a very wet state. And consequently, problems may be experienced on subsequent warming operations. A warming operation approach may be adopted that can adequately accommodate a stack in a very wet hydration state. However, using this approach throughout the "keep warm" strategy would generally put the stack in an unnecessarily low and undesirable hydration state. Further, such an approach uses an excessive amount of stored energy for the warming operations (e.g. fuel) and thus is inefficient.

In prior art "keep warm" strategies, once the supply of energy for performing the warming operations is depleted such that it is no longer possible to continue, the warming operations cease and the system is allowed to cool to ambient. Ambient temperature however may potentially be much lower than the minimum temperature experienced by the stack during the "keep warm" process. At very low ambient temperatures, an even lower hydration state for the fuel cell stack may be preferred for subsequent startup than the hydration state desired during the repeated warming operations of the "keep warm" strategy. Otherwise startup performance from the very low ambient temperature may suffer. Thus, a warming operation approach which is most suitable for the repeated warming operations of a "keep warm" strategy may not be most suitable for the final warming operation. Again, a warming operation approach may instead be adopted that leaves the stack in a lower hydration state suitable for startup at very low ambient temperatures. However, using this approach throughout the "keep warm" strategy would again generally leave the stack in an unnecessarily low, undesirable hydration state throughout the "keep warm" period. And again, such an approach inefficiently uses the available stored energy for the warming operations.

In the present improved methods, a different approach is adopted for the initial and/or the final warming operations in a "keep warm" strategy. In this way, a preferred hydration state can be obtained in the fuel cell stack at all times (e.g. after shutdown in a very wet state, throughout the "keep warm" process, and thereafter if the energy supply is depleted). A variety of approaches may be used in this regard as explained in more detail below.

Figure 1:
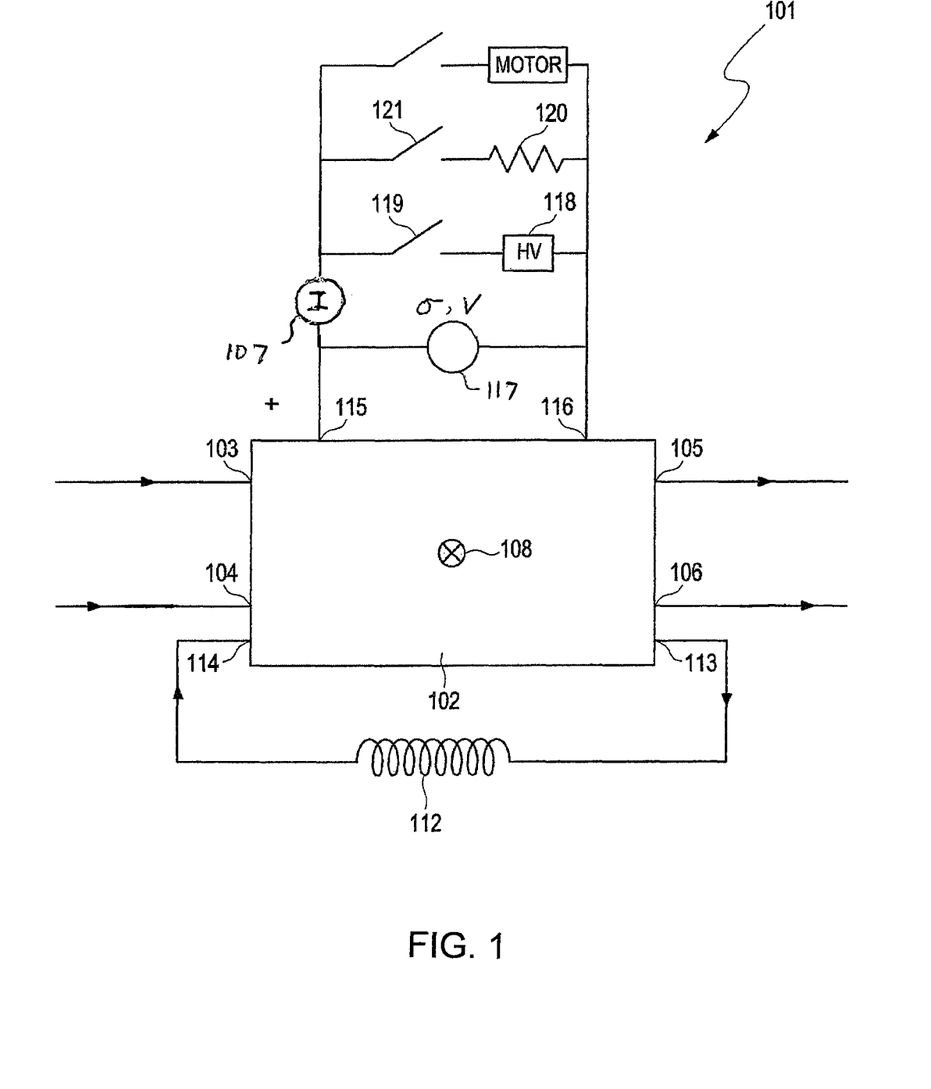
FIG. 1 is a schematic of an exemplary automotive fuel cell system which can benefit using the method of the invention for shutdown and storage at ambient temperatures below freezing.

FIG. 1 shows a schematic of an exemplary automotive fuel cell system that is configured to operate according to methods of the invention. Fuel cell system 101 comprises solid polymer electrolyte fuel cell stack 102 which is supplied with fuel (hydrogen) reactant at fuel inlet 103 and oxidant (air) reactant at oxidant inlet 104. These gaseous reactants are supplied at controlled flow rates and pressures (the controlling hardware is not shown in FIG. 1). The exhaust fluids from the stack anodes and cathodes exit the stack at fuel outlet 105 and oxidant outlet 106 respectively. Fuel cell system 101 also includes a coolant subsystem to control stack temperature. In this subsystem, coolant is obtained from the stack at coolant outlet 113, is circulated through radiator 112, and then returned to the stack at coolant inlet 114.

Fuel cell stack 102 has positive and negative terminals 115, 116 across which several circuits are connected. In this exemplary embodiment, system 101 comprises certain high voltage circuitry 118 (e.g. traction motor, DC-DC converter, and the like) which can be connected to or disconnected from the stack terminals using contactor 119. Further, system 101 comprises electrical load 120 which is of appropriate size for purposes of cold start-up and which is switchably connected across terminals 115 and 116 using switch 121. The vehicle itself comprises drive motor and other peripherals (not shown) which can be connected across the fuel cell stack terminals once start-up is complete.

Fuel cell system 101 comprises several sensors and/or monitors for possible use in carrying out the methods of the invention. Temperature monitoring sensor 108 is located in the middle of the stack in this exemplary embodiment in order to monitor the stack temperature. (However, the temperature may be monitored by other sensors at other locations instead of, or in addition to, sensor 108.) Monitor 117 is connected in parallel across the terminals of stack 102 and may be for measuring average cell conductivity or average cell voltage. Current shunt 107 is provided in series with the stack output and is for measuring current. Polarization characteristics of the stack can be determined from measurements of stack voltage and output current.

Figure 2:
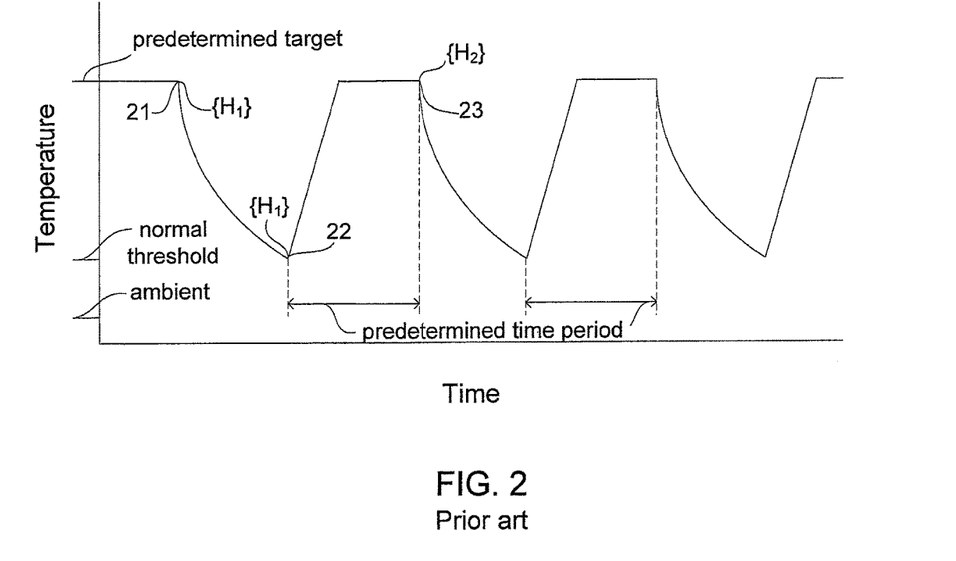
FIG. 2 is a plot of temperature versus time illustrating a prior art method for shutdown and storage involving repeated "keep warm" cycling. Here, the initial "keep warm" cycles are shown.

FIG. 2 shows an illustrative plot of fuel cell stack temperature versus time during a prior art method for shutdown and storage involving repeated "keep warm" cycling or warming operations. Here, the initial "keep warm" cycles (warming operations) are shown. Three different temperatures are noted on the temperature axis; namely ambient, normal threshold, and predetermined target temperatures. In this illustrative plot, ambient temperature is a value well below freezing (e.g. <−15° C.). The normal threshold temperature for triggering the onset of the "keep warm" cycles is at the minimum temperature desirable for the stack during storage (e.g. ~−15° C.). The predetermined target temperature is a desirable value for the stack to be heated to during a "keep warm" cycle. In this example, the predetermined target value is assumed to be the same as the nominal operating temperature of the stack during normal operation. (However, the predetermined target value may optionally be different from the nominal operating temperature.)

In FIG. 2 then, the fuel cell stack is initially shown operating at its nominal operating temperature. At point 21, the stack is shutdown and power production from the stack is stopped. The hydration state of the MEAs in the fuel cell stack here is denoted as $\{H_1\}$. With power production stopped at point 21, the stack and system temperatures start to fall. Unless special additional conditioning steps are taken to prepare for subsequent startup, the hydration state of the stack remains roughly the same as it cools to the normal threshold temperature at point 22. With the "keep warm" strategy implemented, once the stack temperature falls to this normal threshold temperature, a warming operation commences and heats the stack. The warming operation can simply comprise operating the stack using a predetermined set of operating parameters and for a predetermined time period. As a result of the warming, the stack temperature rises to the predetermined target temperature where it may remain for a desired period of time. The total period of time associated with the warming operation is predetermined and is denoted as the predetermined time period in FIG. 2. At the end of the warming operation (point 23), the warming ceases and once again the stack temperature begins to fall. The hydration state in the stack at point 23 is denoted as $\{H_2\}$.

Generally, a set of operating parameters is selected for the warming operations such that a desired hydration state is obtained in the stack that is relatively low and that is suitable for starting the stack up at temperatures below freezing yet above the normal threshold temperature. When the "keep warm" strategy proceeds as intended, this desired hydration state should essentially be maintained throughout the "keep warm" cycling. In FIG. 2' for instance, the hydration state at shutdown $\{H_1\}$ is variable (e.g. depending on driving conditions) and may be somewhat greater or less than the desired hydration state (i.e. $\{H_2\} \neq$ desired hydration state). However, the desired hydration state may be obtained after an initial "keep warm" cycle (i.e. $\{H_2\}$=desired hydration state) if the "keep warm" process can accommodate the differences in $\{H_1\}$. But if $\{H_1\}$ is too great (i.e. too wet after shutdown), the initial "keep warm" cycle may not proceed properly, degradation may occur, and the stack may be left in an undesirable wetter hydration state (i.e. $\{H_2\}$>desired hydration state). Further, the stack may remain in undesirable hydration states after subsequent "keep warm" cycling.

Other steps may optionally be included as part of the "keep warm" cycles or warming operations. For instance, a modest purging step may be included at the end of each cycle (i.e. the predetermined warming operation may include a predetermined purge of the anode flow fields after each predetermined time period).

Figure 3A:
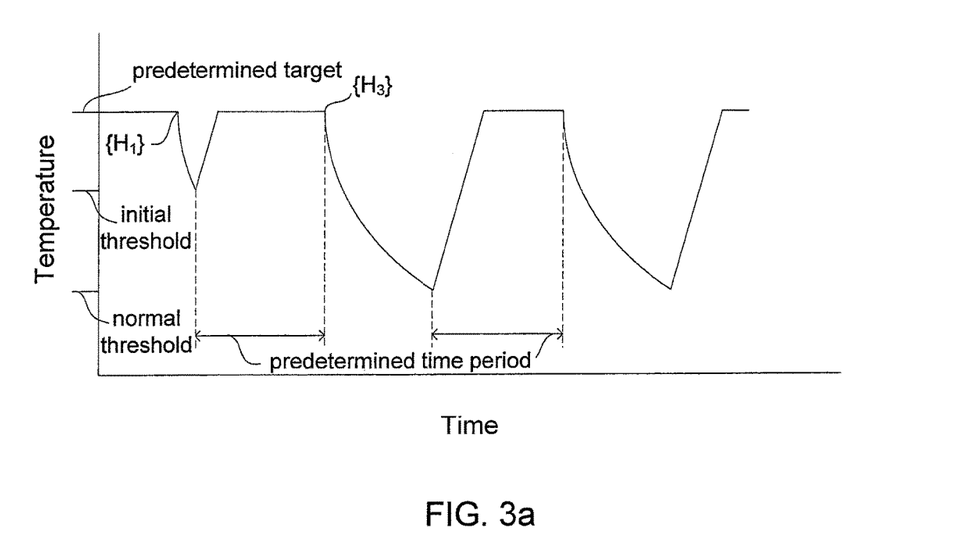
FIG. 3a is a plot of temperature versus time illustrating the initial cycles of an improved method for shutdown and storage. The plot is representative of a method involving a higher initial threshold temperature.

In the present improved methods, the initial warming approach can differ from that used subsequently in order to avoid the aforementioned problems associated with shutting down the stack in a very wet state. In one embodiment, a higher initial threshold temperature may be used. FIG. 3a shows a representative plot of temperature versus time illustrating the initial cycles of this embodiment. Here, the initial warming operation is triggered at the higher initial threshold temperature. Subsequent predetermined warming operations are still triggered at the normal threshold temperature. In this embodiment, the stack is not allowed to cool as much after the initial shutdown. The same set of operating parameters might be used for both the initial and predetermined warming operations. In this embodiment, and as is evident comparing the plots of FIGS. 3a and 2, the stack spends a longer time at the predetermined target temperature during the initial warming operation. The resulting hydration state $\{H_3\}$ at this point can therefore be $<\{H_2\}$. And with an appropriate selection of initial threshold temperature in combination with other operating parameters, it can be possible to achieve a hydration state $\{H_3\}$=desired hydration state, even for a high shutdown value for $\{H_1\}$.

Figure 3B:
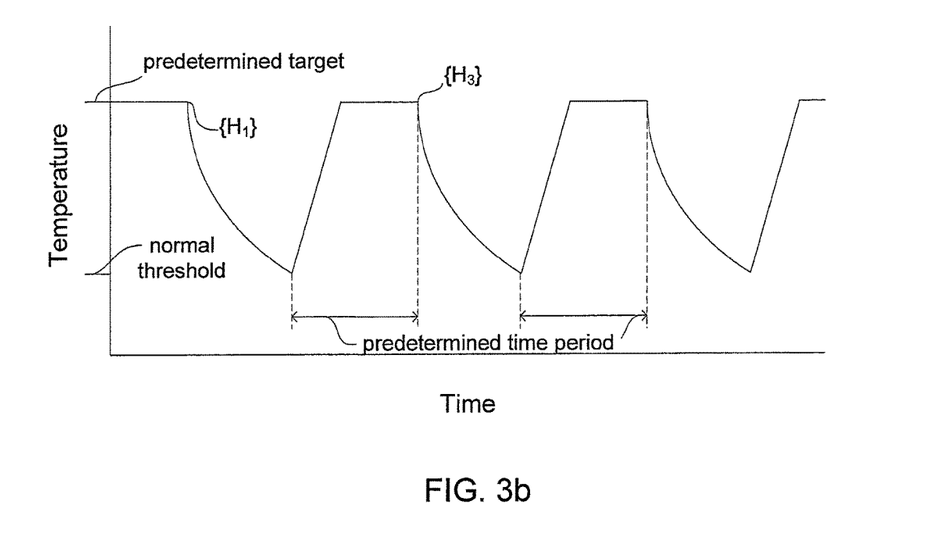
FIG. 3b is a plot of temperature versus time illustrating the initial cycles of an improved method for shutdown and storage. The plot is representative of a method involving a higher reactant flow rate or pressure.

In an alternative approach, an initial warming operation may be used which differs from the predetermined warming operations in order to achieve similar results. FIG. 3b shows a representative plot of temperature versus time illustrating the initial cycles of an embodiment involving the use of a higher reactant flow rate or higher pressure to reduce the resulting hydration state of the stack. Here, the plot looks similar to that shown in prior art FIG. 2. However, as a result of using the higher reactant flow rate and/or higher pressure during the initial warming operation, the stack is drier and again achieves the lower, desired hydration state $\{H_3\}$.

Figure 3C:
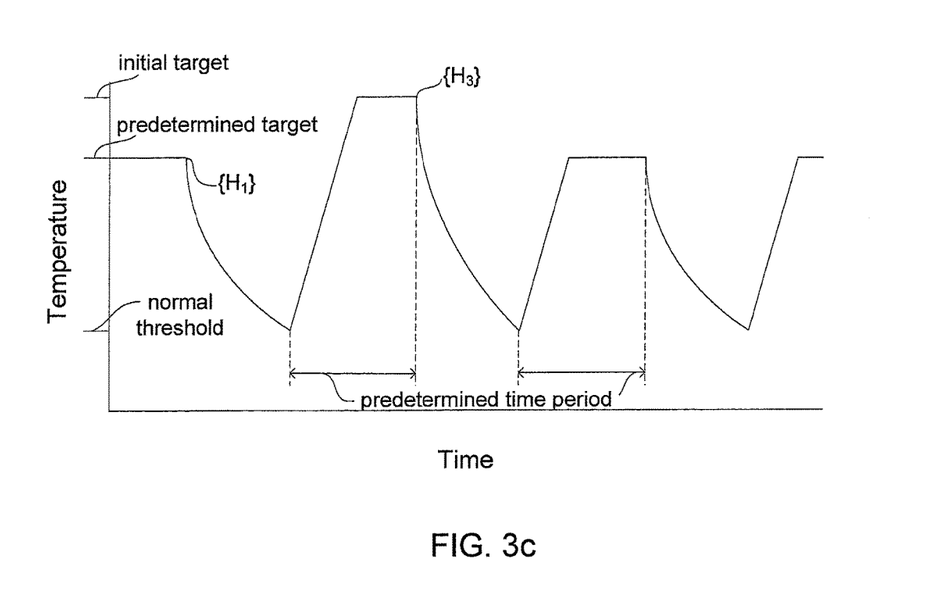
FIG. 3c is a plot of temperature versus time illustrating the initial cycles of an improved method for shutdown and storage. The plot is representative of a method involving a higher initial target temperature.

In another embodiment, a higher initial target temperature may be used in the initial warming operation. FIG. 3c shows a representative plot of temperature versus time illustrating the initial cycles of an embodiment with a higher initial target temperature. As a result of heating the stack to this greater initial temperature in the initial warming operation, the stack is drier and again achieves the lower, desired hydration state $\{H_3\}$.

Figure 3D:
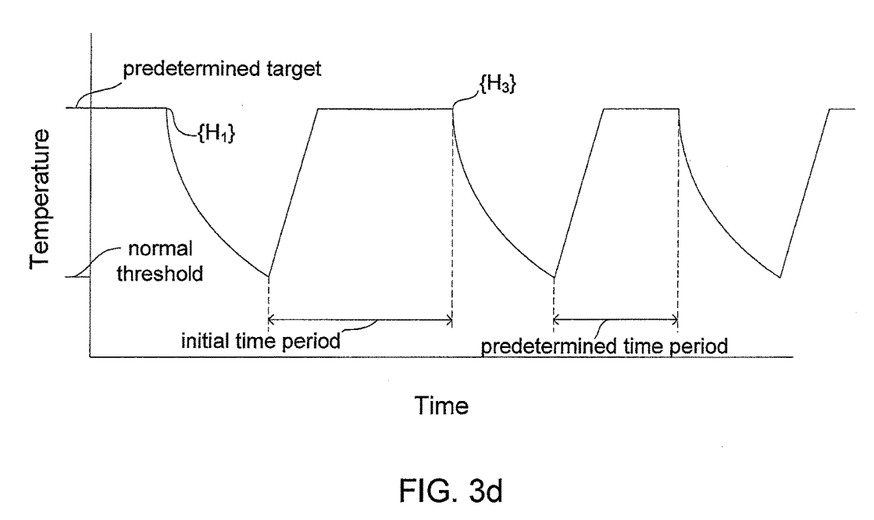
FIG. 3d is a plot of temperature versus time illustrating the initial cycles of an improved method for shutdown and storage. The plot is representative of a method involving a longer initial time period.

In yet another embodiment, a longer time period is employed for the initial warming operation. FIG. 3d shows a representative plot of temperature versus time illustrating the initial cycles of an embodiment having an initial time period greater than the subsequent predetermined time periods. As a result of heating the stack for a longer time in the initial warming operation, the stack is drier and again achieves the lower, desired hydration state $\{H_3\}$.

As will be evident to those skilled in the art, suitable combinations of the above embodiments may also be employed to achieve similar or better results.

Further still, it may be preferred in any of the preceding embodiments for the average hydration state for the cells in the stack to be determined or monitored. The initial warming operation may then be adjusted in accordance with the determined average hydration state. As known to those skilled in the art, the average hydration state may be determined by various methods, such as by derivation based on known stack operating conditions just prior to shutdown, by measuring the average cell conductivity, by comparing the polarization characteristics of the stack to a reference state, and so on.

In yet other embodiments, it may be desirable to increase the normal threshold temperature as the performance of the fuel cell stack degrades over time and/or with use. In addition, it may be desirable to increase the predetermined target temperature as the performance of the fuel cell stack degrades over time and/or with use. As known to those skilled in the art, such degradation may be derived based on the number of startup and shutdowns experienced by the stack, by the total operating time, or by the measured performance of the stack under certain specific operating conditions.

An advantage of the aforementioned methods is that they can be effective when no additional steps, e.g. special purging steps, are used right after power production is stopped (i.e. between the stopping power production step and the initial warming operation) in preparation for later startup of the system from below freezing temperatures. Thus, any such additional steps, which may be time-consuming or add complexity, can instead be omitted.

Figure 4:
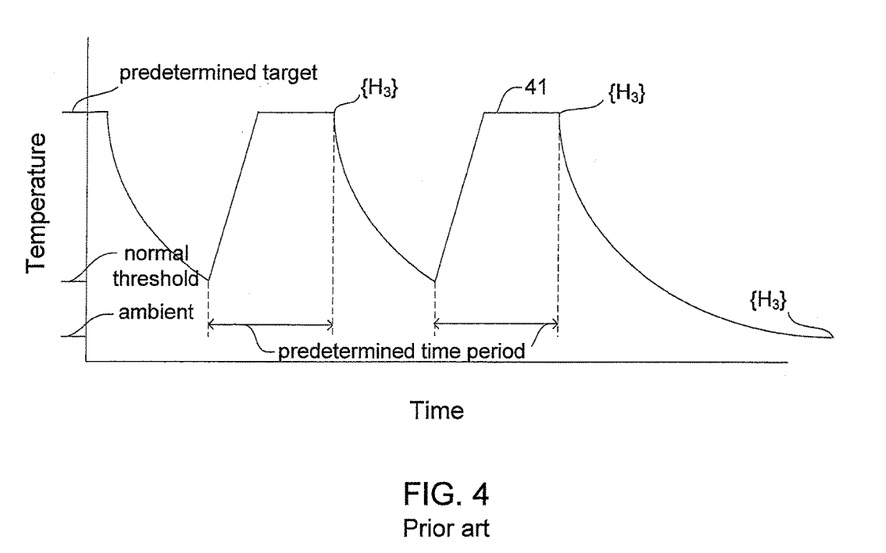
FIG. 4 is a plot of temperature versus time illustrating a prior art method for shutdown and storage involving repeated "keep warm" cycling. Here, the final "keep warm" cycles are shown.

FIG. 4 shows another illustrative plot of fuel cell stack temperature versus time during a prior art method for shutdown and storage involving repeated "keep warm" cycling or warming operations. Here however, the final "keep warm" cycles (warming operations) are shown, namely those cycles just before the supply of energy for performing them is depleted. Again, the ambient, normal threshold, and predetermined target temperatures are noted on the temperature axis.

In FIG. 4, the fuel cell stack is initially shown performing repeated "keep warm" cycles. At point 21, the stack is shutdown and power production from the stack is stopped. The hydration state of the MEAs in the fuel cell stack here is again $H_3$}. During the repeated "keep warm" cycling, the system continually monitors the energy supply available for performing the "keep warm" cycles (or warming operations). When the system detects that the energy supply has become sufficiently depleted so that it will soon be unable to sustain "keep warm" cycles, a final "keep warm" cycle 41 is performed, and then the system is completely shutdown. No further "keep warm" cycling is performed and the fuel cell stack temperature falls to ambient, while essentially remaining in hydration state $\{H_3\}$. As part of the final "keep warm" cycle and hence the complete shutdown process, the system performs a final set of whatever additional optional operations were employed during the previous repeated "keep warm" cycles, e.g. predetermined purges following the predetermined time periods.

While the hydration state $\{H_3\}$ may be desirable during the repeated "keep warm" cycling, an even drier hydration state $\{H_4\}$ may be preferred for startup from potentially much lower ambient temperatures. Optionally therefore, one might consider setting the operating parameters during the "keep warm" cycling such that the hydration state $\{H_4\}$ is obtained. Of course, while this achieves the preferred hydration state for startup from very low ambient temperatures, it means that the hydration state is not optimal during "keep warm" cycling. Further, such an approach again uses more stored energy than is required (for a preferred hydration state) during the warming operations and thus is inefficient.

Figure 5A:
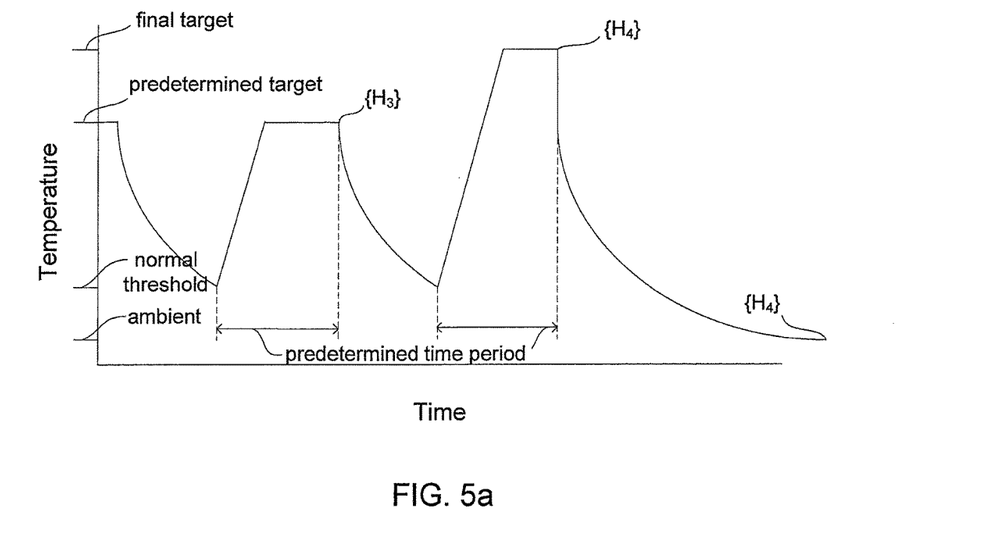
FIG. 5a is a plot of temperature versus time illustrating the final cycles of an improved method for shutdown and storage. The plot is representative of a method involving a higher final target temperature.

In the present improved methods however, this problem can be avoided by employing a final warming approach that differs from that used for the previous repeated predetermined warming operations. In one embodiment, a higher final target temperature may be used in the final warming operation. FIG. 5a shows a representative plot of temperature versus time illustrating the final cycles of an improved method for shutdown and storage involving a higher final target temperature. As a result of heating the stack to this greater final target temperature in the final warming operation, the stack is drier and can achieve the lower, desired hydration state $\{H_4\}$.

Figure 5B:
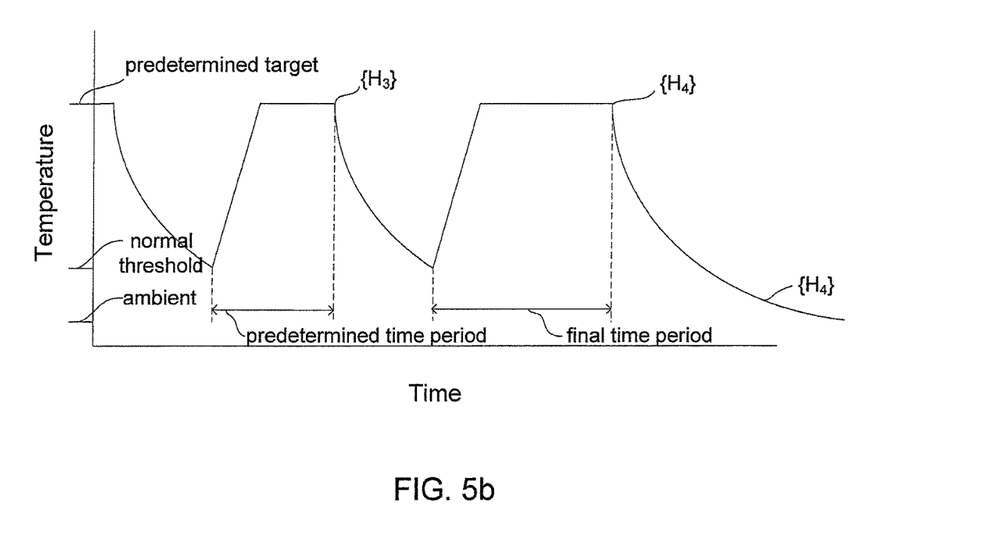
FIG. 5b is a plot of temperature versus time illustrating the final cycles of an improved method for shutdown and storage. The plot is representative of a method involving a longer final time period.

In yet another embodiment, a longer time period is employed for the final warming operation. FIG. 5b shows a representative plot of temperature versus time illustrating the final cycles of an embodiment having a final time period greater than the previous predetermined time periods. As a result of heating the stack for a longer time in the final warming operation, the stack is drier and again achieves the lower, desired hydration state for subsequent startup $\{H_4\}$.

Figure 5C:
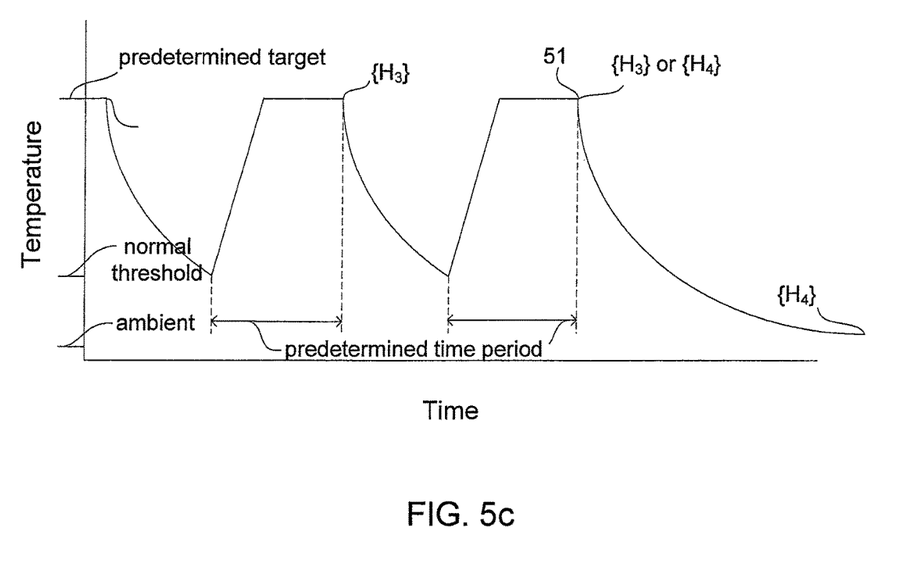
FIG. 5c is a plot of temperature versus time illustrating the final cycles of an improved method for shutdown and storage. The plot is representative of a method involving a higher reactant flow rate, higher reactant pressure, lower relative humidity of a reactant, or a longer final optional purge.

FIG. 5c shows a representative plot of temperature versus time illustrating the final cycles of yet other embodiments involving the use of a lower relative humidity of a reactant, a higher reactant flow rate, a higher reactant pressure, and/or a different optional final purge during the final warming operation in order to reduce the resulting hydration state of the stack. Here, the plot looks similar to that shown in prior art FIG. 4. However, as a result of using a lower reactant relative humidity, a higher reactant flow rate, and/or a lower reactant pressure during the final warming operation, the stack is drier and can achieve the lower, desired hydration state $\{H_4\}$ at the end of the final time period (point 51 in FIG. 5c). In the case of an embodiment employing a different optional final purge, a final purge may be used after the final time period which is longer than the optional predetermined purges used after the predetermined time periods. This alone may be sufficient to achieve the desired hydration state $\{H_4\}$ after heating of the fuel cell stack ceases and the temperature drops to ambient. In such a case, the fuel cell stack hydration state may still be $\{H_3\}$ at point 51, but gradually drops to $\{H_4\}$ as the temperature drops to ambient.

Although the figures and preceding description illustrate several possible specific embodiments of the invention, those skilled in the art will appreciate that other variants and/or combinations of the shutdown and storage procedures may be considered.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A keep-warm method for shutting down and storing a fuel cell system at below freezing temperatures, the fuel cell system prior to shutting down comprising a fuel cell stack that is producing power and an energy supply for heating the fuel cell stack, the method comprising:

stopping power production from the fuel cell stack;
monitoring the amount of energy remaining in the energy supply, wherein the energy supply is selected from the amount of fuel available for producing power in the fuel cell stack and the amount of electricity in a battery for operating an electric heater;
monitoring the temperature of the fuel cell stack;
specifying an amount of energy necessary to perform a final warming operation;
performing, when the temperature of the fuel cell stack drops to a normal threshold temperature, an initial warming operation to keep the fuel cell system above the normal threshold temperature, said warming operation selected from the group consisting of producing power from said fuel cell stack and heating the fuel cell stack with said electric heater;
subsequently performing, each time the fuel cell system temperature drops to the normal threshold temperature, a predetermined warming operation to keep the fuel cell system above the normal threshold temperature, so long as the amount of energy remaining exceeds a minimum amount, said minimum amount being that amount adequate to perform a final warming operation; and in the event the stack temperature falls to the normal threshold temperature and the amount of energy remaining is less than or equal to the minimum amount, performing a final warming operation;

wherein the final warming operation differs from the predetermined warming operation.

2. The method of claim 1 wherein the normal threshold temperature is less than 0° C.

3. A keep-warm method for shutting down and storing a fuel cell system at below freezing temperatures, the fuel cell system prior to shutting down comprising a fuel cell stack that is producing power and an energy supply for heating the fuel cell stack, the method comprising:

stopping power production from the fuel cell stack;

monitoring the amount of energy remaining in the energy supply, wherein the energy supply is selected from the amount of fuel available for producing power in the fuel cell stack and the amount of electricity in a battery for operating an electric heater;

monitoring the temperature of the fuel cell stack;

specifying an amount of energy necessary to perform a final warming operation;

performing, when the temperature of the fuel cell stack drops to a normal threshold temperature, an initial warming operation to keep the fuel cell system above the normal threshold temperature, said warming operation selected from the group consisting of producing power from said fuel cell stack and heating the fuel cell stack with said electric heater;

subsequently performing, each time the fuel cell system temperature drops to the normal threshold temperature, a predetermined warming operation to keep the fuel cell system above the normal threshold temperature, so long as the amount of energy remaining exceeds a minimum amount, said minimum amount being that amount adequate to perform a final warming operation; and in the event the stack temperature falls to the normal threshold temperature and the amount of energy remaining is less than or equal to the minimum amount, performing a final warming operation;

wherein each predetermined warming operation heats the stack to a predetermined target temperature, the final warming operation heats the stack to a final target temperature, and the predetermined target temperature is less than the final target temperature.

4. A keep-warm method for shutting down and storing a fuel cell system at below freezing temperatures, the fuel cell system prior to shutting down comprising a fuel cell stack that is producing power and an energy supply for heating the fuel cell stack, the method comprising:

stopping power production from the fuel cell stack;

monitoring the amount of energy remaining in the energy supply, wherein the energy supply is selected from the amount of fuel available for producing power in the fuel cell stack and the amount of electricity in a battery for operating an electric heater;

monitoring the temperature of the fuel cell stack;

specifying an amount of energy necessary to perform a final warming operation;

performing, when the temperature of the fuel cell stack drops to a normal threshold temperature, an initial warming operation to keep the fuel cell system above the normal threshold temperature, said warming operation selected from the group consisting of producing power from said fuel cell stack and heating the fuel cell stack with said electric heater;

subsequently performing, each time the fuel cell system temperature drops to the normal threshold temperature, a predetermined warming operation to keep the fuel cell system above the normal threshold temperature, so long as the amount of energy remaining exceeds a minimum amount, said minimum amount being that amount adequate to perform a final warming operation; and in the event the stack temperature falls to the normal threshold temperature and the amount of energy remaining is less than or equal to the minimum amount, performing a final warming operation;

wherein each predetermined warming operation heats the stack for a predetermined time period, the final warming operation heats the stack for a final time period, and the predetermined time period is less than the final time period.

5. The method of claim 1 wherein said final warming operation comprises supplying at least one reactant gas selected from fuel and oxidant to the fuel cell stack and producing power in the fuel cell stack, and wherein the relative humidity of the reactant gas supplied to the fuel cell stack is lower during the final warming operation than during the predetermined warming operation.

6. The method of claim 1 wherein said final warming operation comprises supplying at least one reactant gas selected from fuel and oxidant to the fuel cell stack and producing power in the fuel cell stack, and wherein the flow rate of the reactant gas supplied to the fuel cell stack is greater during the final warming operation than during the predetermined warming operation.

7. The method of claim 1 wherein said final warming operation comprises supplying at least one reactant gas selected from fuel and oxidant to the fuel cell stack and producing power in the fuel cell stack, and wherein the pressure of the reactant gas supplied to the fuel cell stack is lower during the final warming operation than during the predetermined warming operation.

8. The method of claim 1 wherein:

the predetermined warming operation comprises:
heating the stack for a predetermined time period; and
performing a predetermined purge after the predetermined time period;

the final warming operation comprises:
heating the stack for a final time period; and
performing a final purge after the final time period; and wherein the final purge is longer than the predetermined purge.

9. The method of claim 1 wherein the steps of performing the predetermined and the final warming operations are selected from the group consisting of producing power from the fuel cell stack and heating the fuel cell stack with an electric heater.

* * * * *